US012768690B2

(12) United States Patent
Okada et al.

(10) Patent No.: US 12,768,690 B2
(45) Date of Patent: Oct. 20, 2026

(54) VARIABLY CHOKED PRESSURE RATE-OF-RISE MASS FLOW VERIFIER

(71) Applicant: Applied Materials, Inc., Santa Clara, CA (US)

(72) Inventors: Ashley Okada, San Jose, CA (US); Ming Xu, San Jose, CA (US); Srikanth Krishnamurthy, Banglore (IN); Andreas Johannes Jendrzey, Friedberg (DE)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 19/179,974

(22) Filed: Apr. 15, 2025

(65) Prior Publication Data

US 2025/0327695 A1 Oct. 23, 2025

Related U.S. Application Data

(60) Provisional application No. 63/636,037, filed on Apr. 18, 2024.

(51) Int. Cl.
*G01F 1/37* (2006.01)
*G01L 19/00* (2006.01)
*G01L 13/04* (2006.01)

(52) U.S. Cl.
CPC ............ *G01F 1/37* (2013.01); *G01L 19/0092* (2013.01); *G01L 13/04* (2013.01)

(58) Field of Classification Search
CPC ..... G01F 1/34; G01F 1/36; G01F 1/37; G01F 1/86; G01F 25/15; G01F 25/17; G01L 13/04; G01L 19/0092; G05D 7/0635
See application file for complete search history.

(56) References Cited

U.S. PATENT DOCUMENTS 5,868,159 A * 2/1999 Loan .................... G05D 7/0635 137/486
6,119,710 A * 9/2000 Brown ...................... G01F 1/88 137/486
7,424,895 B2 9/2008 Tison et al.
(Continued)

OTHER PUBLICATIONS

International Search Report and Written Opinion for International Application No. PCT/US2025/025242, mailed Aug. 12, 2025, 08 Pages.

*Primary Examiner* — David L Singer
(74) *Attorney, Agent, or Firm* — Lowenstein Sandler LLP

(57) ABSTRACT

A method includes opening a flow path from a gas stick through a variable orifice, a chamber, and an outlet isolation valve of the chamber. The method further includes causing a gas to flow through the flow path at a flow rate setpoint. The method further includes actuating an opening of the variable orifice to establish a choked pressure regime within the chamber, the choked pressure regime being achieved by causing a first pressure upstream of the variable orifice to be at least two times a second pressure downstream of the variable orifice. The method further includes closing the outlet isolation valve to cause the chamber to be filled with the gas from the gas stick. The method further includes measuring a pressure rate-of-rise within the chamber. The method further includes determining one or more flow measurements based at least in part on the pressure rate-of-rise.

20 Claims, 6 Drawing Sheets

(56) References Cited

U.S. PATENT DOCUMENTS

| | | | | |
|---|---|---|---|---|
| 7,743,670 | B2 * | 6/2010 | Lee | G01F 25/15 73/861.08 |
| 2002/0174898 | A1 * | 11/2002 | Lowery | G05D 7/0635 137/487.5 |
| 2006/0283254 | A1 * | 12/2006 | Ding | G01F 25/15 73/700 |
| 2008/0115560 | A1 | 5/2008 | Shareef et al. | |
| 2008/0195332 | A1 | 8/2008 | Wong et al. | |
| 2009/0112504 | A1 * | 4/2009 | Ding | G01F 22/02 702/100 |
| 2017/0370763 | A1 * | 12/2017 | Brashear | G01F 1/86 |
| 2018/0106247 | A1 | 4/2018 | Yamashima et al. | |
| 2018/0172491 | A1 | 6/2018 | Ding et al. | |
| 2022/0333972 | A1 * | 10/2022 | Spyropoulos | G01F 25/15 |
| 2023/0304837 | A1 * | 9/2023 | Ding | G01F 1/42 |

* cited by examiner

VARIABLY CHOKED PRESSURE RATE-OF-RISE MASS FLOW VERIFIER

RELATED APPLICATIONS

This application claims the benefit of Provisional Application No. 63/636,037, filed Apr. 18, 2024, which is incorporated by reference in its entirety.

TECHNICAL FIELD

The present disclosure generally relates to systems and methods for managing gas flow. More particularly, the present disclosure relates to systems and methods for managing gas flow in semiconductor manufacturing systems.

BACKGROUND

Semiconductor manufacturing processes rely on precise control of gas flow within processing chambers. The management of gas flow can help to maintain target conditions during fabrication, particularly in deposition and etching operations. Such management of gas flow can help to ensure high precision and quality in the intricate patterning and structuring of semiconductor devices.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one aspect of the disclosure, a method includes opening a flow path from a gas stick through a variable orifice, a chamber, and an outlet isolation valve of the chamber. The method further includes causing a gas to flow through the flow path at a flow rate setpoint. The method further includes actuating an opening of the variable orifice to establish a choked pressure regime within the chamber, where the choked pressure regime is achieved by causing a first pressure upstream of the variable orifice to be at least two times a second pressure downstream of the variable orifice. The method further includes closing the outlet isolation valve to cause the chamber to be filled with the gas from the gas stick. The method further includes subsequently determining a pressure rate-of-rise by measuring a pressure rate-of-rise within the chamber. The method further includes determining one or more flow measurements based at least in part on the pressure rate-of-rise.

In another aspect of the disclosure, a system includes a mass flow verification unit. The mass flow verification unit includes a chamber. The mass flow verification unit further includes an inlet to couple the chamber to a gas source and an outlet to couple the chamber to an exhaust line. The mass flow verification unit further includes a variable orifice coupled to the inlet. The mass flow verification unit further includes an outlet isolation valve coupled to the outlet, where the inlet, the chamber and the variable orifice make up a flow path for a gas from the gas source. The mass flow verification unit further includes a first pressure sensor coupled to the inlet upstream of the variable orifice. The mass flow verification unit further includes a second pressure sensor coupled to the chamber. The mass flow verification unit further includes a controller to cause the chamber to be placed into a choked pressure regime while the gas is flowed into the chamber based at least in part on measurements from the first pressure sensor. The controller is further to determine a pressure rate-of-rise within the chamber under the choked pressure regime based at least in part on measurements from the second pressure sensor. The controller is further to determine one or more flow measurements based at least in part on the pressure rate-of-rise.

In another aspect of the disclosure, a mass flow verification system includes a gas panel, having at least one gas stick, where the at least one gas stick includes a mass flow controller. The mass flow verification system further includes a mass flow verifier operatively coupled to the at least one gas stick. The mass flow verifier includes a chamber. The mass flow verifier further includes an inlet to couple the chamber to the gas stick and an outlet to couple the chamber to an exhaust line. The mass flow verifier further includes a variable orifice coupled to the inlet. The mass flow verifier further includes an outlet isolation valve coupled to the outlet, where the inlet, the chamber and the variable orifice make up a flow path for a gas from the gas stick. The mass flow verifier further includes a first pressure sensor coupled to the inlet upstream of the variable orifice. The mass flow verifier further includes a second pressure sensor coupled to the chamber. The mass flow verifier further includes a controller to cause the chamber to be placed into a choked pressure regime while the gas is flowed into the chamber based at least in part on measurements from the first pressure sensor. The controller if further to determine a pressure rate-of-rise within the chamber under the choked pressure regime based at least in part on measurements from the second pressure sensor. The controller if further to determine one or more flow measurements based at least in part on the pressure rate-of-rise.

BRIEF DESCRIPTION OF THE DRAWINGS

The present disclosure is illustrated by way of example, and not by way of limitation in the figures of the accompanying drawings.

DETAILED DESCRIPTION

Figure 1:
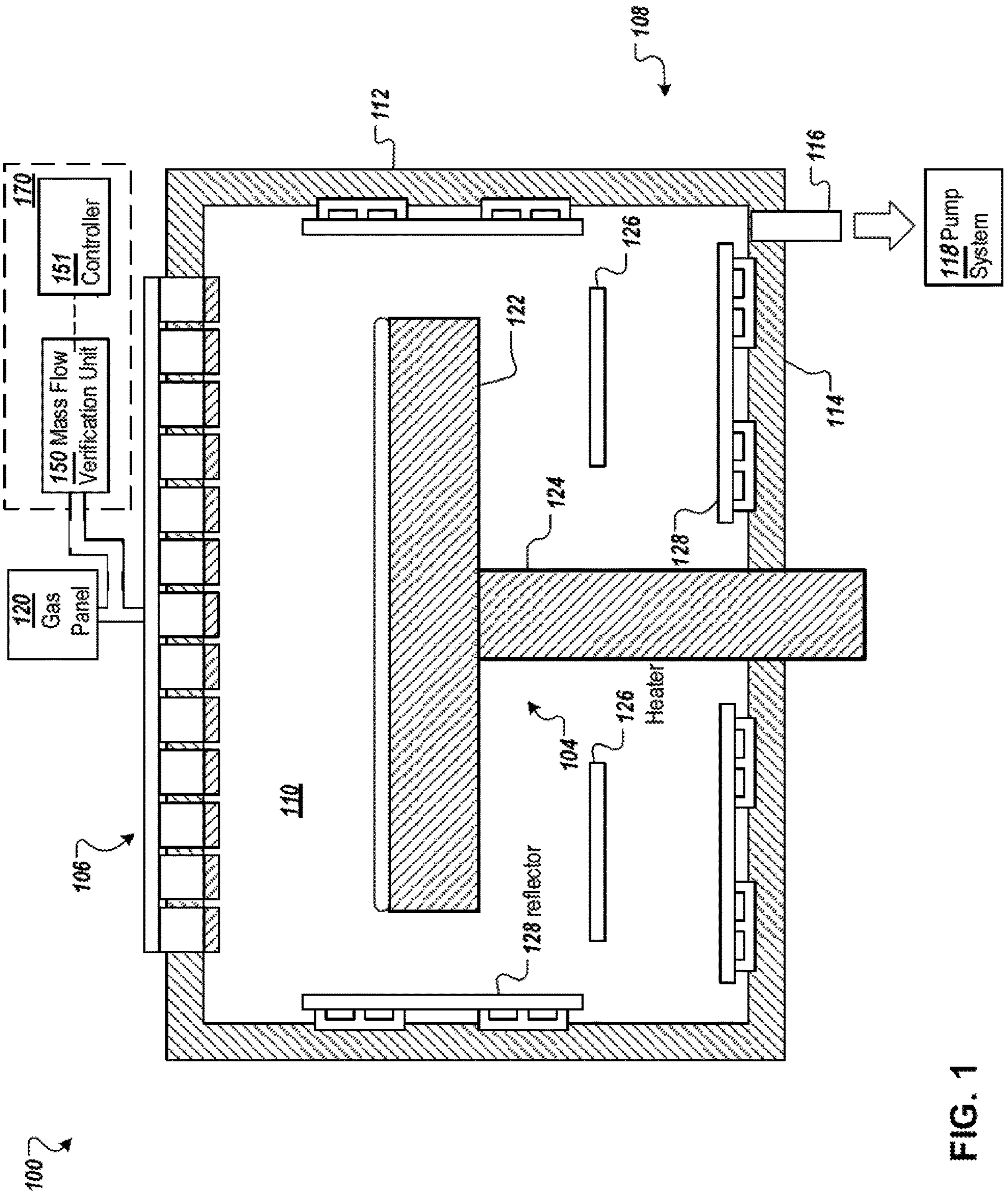
FIG. 1 depicts a sectional view of a manufacturing chamber, according to some embodiments.

In semiconductor manufacturing, gas flow control is used in processes such as chemical vapor deposition (CVD), physical vapor deposition (PVD), etching, and doping. These processes and others involve managing gas flow for the fabrication and treatment of semiconductor materials. Such processes can be affected by fluctuations in gas flow and composition. Precise control of gas flow can help to maintain a target environment within various processing chambers. In semiconductor manufacturing systems, a gas stick, which is a component of a gas panel, is often utilized to supply gas flow to a processing chamber for different manufacturing processes. The gas stick typically includes a Mass Flow Controller (MFC) that regulates the rate of gas flow from the gas stick using an internal flow sensor. During a processing operation, a MFC can be set to a certain flow rate setpoint. However, there are instances where flow rate setpoints of MFCs may be inaccurate due to inaccuracies (e.g., drift, miscalibration, etc.) of the internal flow sensor of the MFC. The internal flow sensor and the flow rate setpoints of the MFC may drift over time, causing them to deviate from a calibrated state. Recalibration may be performed to return the MFC to a calibrated state. Such inaccuracies in the flow rate setpoints of the MFC can lead to defects in manufactured semiconductor products, leading to increased costs and inefficiencies in production time if they are not detected and corrected.

Conventionally, flow rate setpoints controlled based on measurements of the internal flow sensors of MFCs are verified using standard calibration methods that involve rate-of-rise volumes or external calibration systems. These methods typically involve measuring the time it takes for the pressure to rise in a process chamber at a set flow rate (e.g., a flow rate setpoint). However, such conventional techniques may not always accurately decouple stray volumes (e.g., from rate-of rise volumes), such as those connected to process chamber for which a rate-of-rise volume is measured, leading to imprecise flow rate verification measurements. Additionally, these methods generally do not support a wide range of testable flow rates, which limits their effectiveness and practicality in various manufacturing scenarios. Furthermore, conventional verification methods do not sufficiently replicate exact process pressure conditions, which are useful for accurate verification and calibration of MFCs. This limitation can result in the MFC not delivering the correct flow rate when there are variations in downstream pressure. Additionally, uncontrolled exhaust processes can lead to gas condensation, which further complicates the accuracy of flow rate verification and calibration. This condensation can change the measurable volume within the system (e.g., within the process chamber) and obstructs effective gas evacuation from the rate-of-rise volume, undermining both the precision and reliability of the verification process and negatively effecting system health. Lastly, conventional systems lack mobility and cannot be easily moved from one chamber to another, which impedes the ability to achieve enhanced chamber matching. For example, conventional means of calibrating a gas stick assembly measure a rate of rise of pressure in a process chamber, which is immobile.

Aspects and implementations of the present disclosure address these and other challenges of the existing technology by providing systems (e.g., calibration systems) and methods for variably choked rate-of-rise mass flow verification. A system can include a controller and a mass flow verifier for verifying flow rates measured by sensors associated with MFCs (e.g., internal flow sensors of MFCs). The mass flow verifier can include a rate-of-rise volume with an inlet that couples the rate-of-rise volume to a gas stick and an outlet that couples the rate-of-rise volume to an exhaust line. The rate-of-rise volume may be a container having a known internal volume in embodiments. A variable orifice can be coupled to the inlet of the rate-of-rise volume and an outlet isolation valve can be coupled to the outlet. The inlet, the rate-of-rise volume, and the variable orifice make up a flow path for a gas from the gas stick. The mass flow verifier can further include a first pressure sensor coupled to the inlet upstream of the variable orifice and a second pressure sensor coupled to the rate-of-rise volume. A temperature sensor may be coupled to the rate-of-rise volume.

Gas is flowed into the rate-of-rise volume at a flow rate setpoint determined using an internal flow sensor of an MFC. The rate-of-rise volume can be placed into a choked pressure regime by using the controller to actuate an opening of the variable orifice to establish the choked pressure regime within the rate-rise-volume. The choked pressure regime is achieved by actuating the opening of the orifice such that a first pressure upstream of the variable orifice is at least two times a second pressure downstream of the variable orifice while the gas flows through the flow path at the flow rate setpoint in embodiments.

The controller closes the outlet isolation valve when the choked pressure regime is achieved to cause the chamber to be filled with the gas from the gas stick. The controller determines a pressure rate-of-rise within the rate-of-rise volume under the choked pressure regime using measurements from the second pressure sensor coupled to the rate-of-rise volume and a flow duration. The controller can determine a first flow rate based on the pressure rate-of-rise, the volume of the rate-of-rise volume, and temperature measurements from the temperature sensor coupled to the rate-of-rise volume. The controller can determine a second flow rate based the internal flow sensor of the MFC included in the gas stick. The controller can determine a difference between the first flow rate and the second flow rate and determine an offset to apply to the internal flow sensor of the MFC in the gas stick based on the difference. The now calibrated gas stick can then be accurately used to provide one or more gases to a process chamber. In some embodiments, applying the offset to the internal flow sensor of the MFC results in accurate flow rate setpoints from the MFC.

In some embodiments, a variable solenoid can be coupled to the outlet isolation valve of the rate-of-rise volume downstream of the outlet isolation valve. Following the flow rate verification and application of any potential offset, an opening of the variable solenoid can be actuated to control a pressure pump down of the rate-of-rise volume according to a predetermined pressure profile, avoiding condensation of the gas upon evacuation from the rate-of-rise volume.

Aspects and implementations of the present disclosure result in technological advantages as compared to traditional techniques for calibrating gas stick assemblies. Aspects and implementations of the present disclosure can enable more accurate decoupling of stray volumes (e.g., from rate-of rise volumes), resulting in enhanced accuracy of flow rate measurements. Additionally, aspects and implementations of the present disclosure support a broad spectrum of testable flow rates, increasing the effectiveness and practicality of the present disclosure across various manufacturing scenarios. Furthermore, aspects and implementations of the present disclosure can replicate process pressure conditions more accurately than conventional approaches, resulting in more accurate verification and calibration of MFCs. Such accurate replication of process pressure conditions enables reliable flow rate control even when there are variations in downstream pressure. Aspects and implementations of the present disclosure are designed for mobility, allowing for easy transfer of a calibration system between chambers to facilitate precise chamber matching. Moreover, aspects and implementations of the present disclosure contribute to the accuracy of flow rate setpoints in MFCs by addressing drift in internal flow sensors of the MFCs. Over time, these setpoints and sensors may experience drift, and may benefit from recalibration. Through such recalibration, aspects and implementations of the present disclosure correct flow rate setpoint inaccuracies in MFCs, leading to a reduction in semiconductor product defects, cost savings, and improved efficiency in production time. Lastly, aspects and implementations of the present disclosure can avoid condensation of gases within the rate-of-rise volume, which can improve system health and increase accuracy of flow rate verification and calibration.

FIG. 1 depicts a sectional view of a manufacturing chamber 100 (e.g., a semiconductor processing chamber), according to some aspects of this disclosure. Manufacturing chamber 100 may be one or more of an etch chamber (e.g., a plasma etch chamber), deposition chamber (including atomic layer deposition, chemical vapor deposition, physical vapor deposition, or plasma enhanced versions thereof), anneal chamber, or the like. For example, manufacturing chamber 100 may be a chamber for a plasma etcher, a plasma cleaner, atomic layer deposition (ALD) device, chemical vapor deposition (CVD) device, and so forth. Examples of chamber components may include a substrate support assembly 104, an electrostatic chuck, a ring (e.g., a process kit ring), a chamber wall, a base, a showerhead 106, a gas distribution plate, a liner, a liner kit, a shield, a plasma screen, a flow equalizer, a cooling base, a chamber viewport, a chamber lid, a nozzle and so on.

In one embodiment, manufacturing chamber 100 may include a chamber body 108 and a showerhead 106 that enclose an interior volume 110. In some chambers, showerhead 106, may be replaced by a lid and a nozzle. Chamber body 108 may be constructed from aluminum, stainless steel, or other suitable material. Chamber body 108 generally includes sidewalls 112 and a bottom 114.

An exhaust port 116 may be defined in chamber body 108 and may couple interior volume 110 to a pump system 118. Pump system 118 may include one or more pumps and valves utilized to evacuate and regulate the pressure of interior volume 110 of manufacturing chamber 100. An actuator to control gas flow out of the chamber and/or pressure in the chamber may be disposed at or near exhaust port 116.

Showerhead 106 may be supported on sidewalls 112 of chamber body 108 or on a top portion of the chamber body. Showerhead 106 (or the lid, in some embodiments) may be opened to allow access to interior volume 110 of manufacturing chamber 100 and may provide a seal for manufacturing chamber 100 while closed.

Showerhead 106 may include multiple gas delivery holes throughout. Examples of processing gases that may be used to process substrates in manufacturing chamber 100 may include toxic gases, non-toxic gases, or a combination thereof. For example, the processing gases may include halogen-containing gases, such as $C_2F_6$, $SF_6$, $SiCl_4$, HBr, $NF_3$, $CF_4$, $CHF_3$, $F_2$, $Cl_2$, $CCl_4$, $BCl_3$, and $SiF_4$, among others, and other gases such as $O_2$ or $N_2O$. Examples of carrier gases include $N_2$, He, Ar and other gases inert to process gases (e.g., non-reactive gases).

Substrate support assembly 104 may be disposed in interior volume 110 of manufacturing chamber 100 below showerhead 106. In some embodiments, substrate support assembly 104 includes a susceptor 122 and shaft 124. Substrate support assembly 104 supports a substrate during processing. In some embodiments, also disposed within manufacturing chamber 100 are one or more heaters 126 and reflectors 128.

Gas panel 120 may be coupled to manufacturing chamber 100 to provide process or cleaning gases to interior volume 110 through showerhead 106 (or lid and nozzle). The gas panel 120 may be coupled to the manufacturing chamber 100 to provide process and/or cleaning gases via one or more supply line to the interior volume 110 through showerhead 106. The gas panel 120 may include or be connected to one or more flow control apparatus (e.g., one or more MFCs). The flow control apparatus(es) may be used to measure and control the flow of one or more gasses from one or more gas sources (e.g., gas sticks) to interior volume 110. In one embodiment, the gas panel 120 includes multiple gas stick assemblies, as detailed below with reference to FIG. 2. Each gas stick assembly may include one or more valves, filters, mass flow controllers (MFCs) and/or other components, as set forth below.

A mass flow verification unit 150 may be coupled to a gas stick of gas panel 120 in embodiments. For example, a valve connecting the gas stick to the process chamber may be closed, and the gas stick may be temporarily connected to mass flow verification unit 150, upstream of mass flow verification unit 150. Mass flow verification unit 150 is coupled to a controller 151. Mass flow verification unit 150 can include a chamber or container (e.g., a rate-of-rise volume) having an inlet that couples the chamber to the gas stick of the gas panel 120 and an outlet that couples the chamber to an exhaust line of the mass flow verification unit 150. A variable orifice can be coupled to the inlet of the chamber and an outlet isolation valve can be coupled to the outlet of the chamber.

Gas can be flowed into the chamber from the gas stick through a flow path at a flow rate setpoint, for example, by setting a flow rate setpoint of an MFC of the gas stick to a predetermined flow rate. The flow path can include the inlet, the chamber, and the variable orifice. The flow rate setpoint can be achieved using an internal flow sensor of the MFC of the gas stick. However, the internal flow sensor of the MFC of the gas stick can be subject to drift or miscalibration over time, potentially leading to inaccuracies in maintaining the designated flow rate setpoint. Mass flow verification unit 150 can be configured to test the MFC controller of the gas stick to determine the accuracy of the MFC.

The chamber of the mass flow verification unit 150 can be placed into a choked pressure regime by using controller 151 to actuate an opening of the variable orifice to establish the choked pressure regime within the chamber. The choked pressure regime is achieved when a first pressure upstream of the variable orifice is at least two times a second pressure downstream of the variable orifice while the gas flows through the flow path at the flow rate setpoint.

In some embodiments, to establish the choked pressure regime the controller 151 is to determine a target pressure upstream of the variable orifice based on a process to be simulated (e.g., including a flow rate setpoint). In some embodiments, parameters of the process to be simulated can be a flow rate (e.g., flow rate setpoint), pressure, temperature, fluid properties (e.g., type of gas), etc. In some embodiments, the process to be simulated can be characterized by target process conditions (e.g., flow rate, pressure, temperature, gas type, etc.). The controller is further to measure an actual pressure upstream of the variable orifice using the first pressure sensor. In some embodiments, the first pressure sensor can be a manometer. The controller is further to actuate the opening of the variable orifice to cause the actual pressure to match the target pressure.

In some embodiments, to establish the choked pressure regime the controller is to determine a target pressure ratio between a first pressure upstream of the variable orifice and a second pressure downstream of the variable orifice. The target pressure ratio can be a ratio between a first pressure upstream of the variable orifice is and a second pressure downstream of the variable orifice. In some embodiments, the target pressure ratio can be a two-to-one ratio between the first pressure upstream of the variable orifice and the second pressure downstream of the variable orifice. Achieving the target pressure ratio means achieving the choked pressure regime. The controller is further to determine an actual pressure ratio between the first pressure and the second pressure by measuring the first pressure and the second pressure using the first pressure sensor. In some embodiments, the first pressure sensor can be a differential manometer capable of measuring two different pressures at two different points (e.g., a first point upstream of the variable orifice and a second point downstream of the variable orifice). The controller is further to actuate the opening of the variable orifice to cause the actual pressure ratio to match the target pressure ratio.

Controller 151 closes the outlet isolation valve when the choked pressure regime is achieved to cause the chamber to be filled with the gas from the gas stick. Controller 151 determines a pressure rate-of-rise within the chamber under the choked pressure regime using measurements from pressure sensors of mass flow verification unit 150 and a flow duration. Controller 151 can determine a first flow rate based on the pressure rate-of-rise, the volume of chamber, and temperature measurements (e.g., from a temperature sensor coupled to the chamber).

In some embodiments, Controller 151 can determine a second flow rate based the internal flow sensor of the MFC. Controller 151 can determine a difference between the first flow rate and the second flow rate and determine an offset to apply to the internal flow sensor of the MFC based on the difference.

In some embodiments, mass flow verification unit 150 includes a variable solenoid coupled to the outlet of the chamber downstream of the outlet. Mass flow verification unit 150 further includes a pump coupled to the variable solenoid downstream of the variable solenoid. The pump is to remove the gas from the chamber (e.g., following correction of drift to the internal flow sensor of the MFC).

After using mass flow verification unit 150 to calibrate one gas stick of the gas panel 120, the mass flow verification unit 150 may be disconnected from the gas stick and attached to a second gas stick of the gas panel to calibrate the second gas stick. This process may be repeated until all gas sticks of the gas assembly 120 have been calibrated.

In some embodiments, mass flow verification unit 150 is a portable unit 170 including a wheeled cart. Portable unit 170 may also include controller 151. Portable unit 170 can be moved between process chambers to measure and/or calibrate gas sticks and/or other components of gas panels 120 for multiple process chambers in embodiments. Portable unit 170 can be used, for example, for chamber matching across multiple chambers of a semiconductor manufacturing system. Chamber matching in a semiconductor manufacturing system helps to promote consistency in semiconductor manufacturing across various tools and chambers. Chamber matching for gas flow rates of MFCs of gas sticks can help to improve accuracy of gas panels flowing gases during the semiconductor fabrication process. By moving portable unit 170 from chamber to chamber, portable unit 170 can accurately measure and verify the flow rates set by the MFCs in each chamber. This portable verification allows for adjustments and calibration of the MFCs on a per-chamber basis, thereby achieving uniformity in process conditions across various chambers and enhancing the overall precision and repeatability of the semiconductor manufacturing process.

Figure 2:
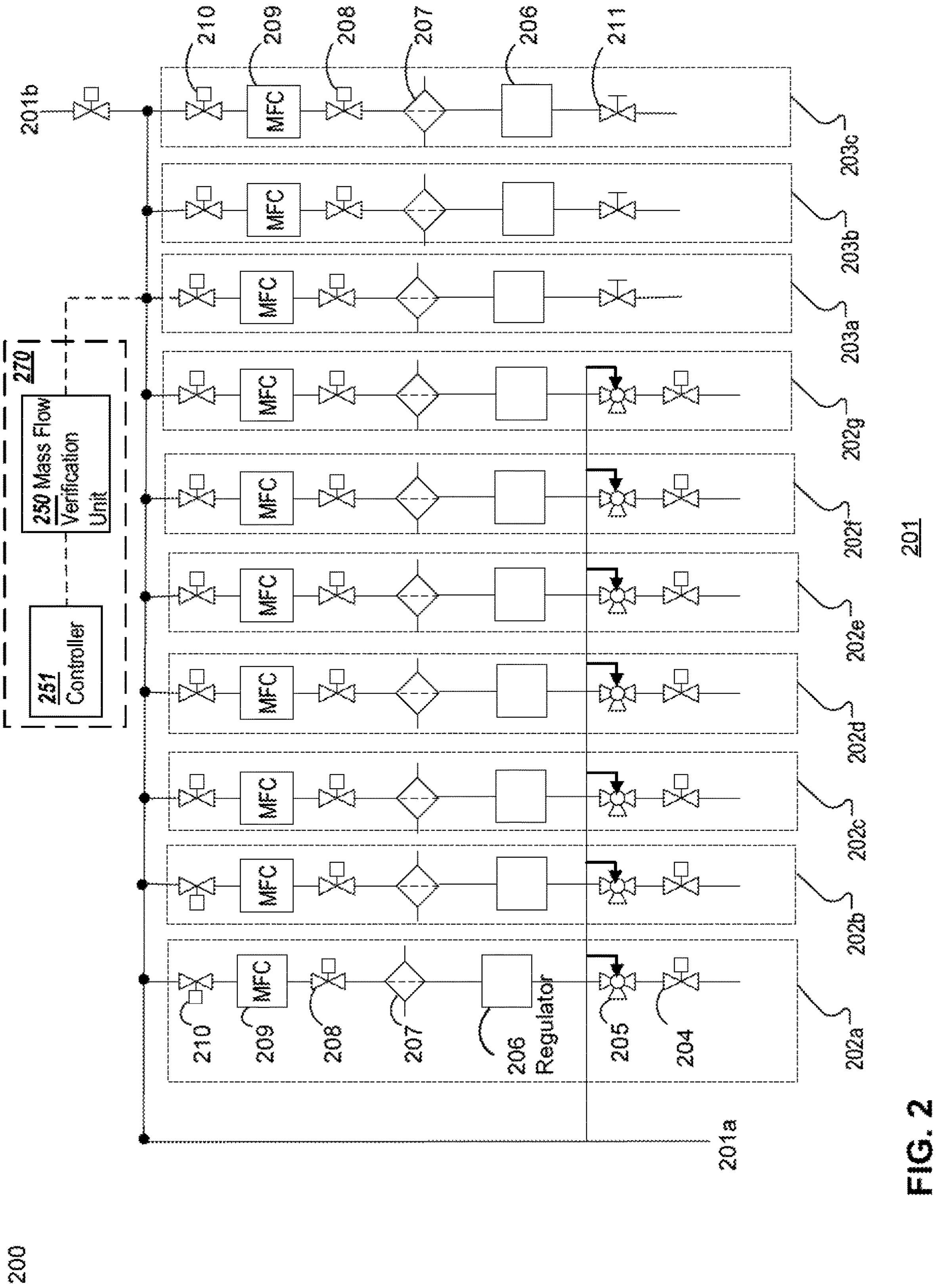
FIG. 2 illustrates a schematic of a gas panel of a manufacturing chamber, according to some embodiments.

FIG. 2 is a schematic of a gas panel 200 that may be used in the manufacturing chamber of FIG. 1, according to some embodiments. As described above, the gas panel provides process and/or cleaning gases to the showerhead and/or to other components of a processing chamber. To effectively provide a process or cleaning gas, a gas stick assembly may be utilized.

The gas stick assembly of the present disclosure may be used with a toxic gas (e.g., as with gas stick assemblies 202*a-g*) or may be used with an inert or non-toxic gas (e.g., as with gas stick assemblies 203*a-c*). Each gas stick assembly 202*a-g*, 203*a-c* may be used to flow a different gas into the processing chamber in embodiments. To provide gas flow through the gas panel 200, a gas enters the panel through one end of the panel 201*a*. For example, if a cleaning gas is used, it may enter the gas stick assembly where it flows through the appropriate gas stick assembly 202*a-g*, 203*a-c* and then flows into the processing chamber through an output end 201*b*.

The gas panel may include a single gas stick assembly 202*a-g*, multiple gas stick assemblies 202*a-g*, a single inert gas stick assembly 203*a-c*, and/or multiple inert gas stick assemblies 203*a-c*. For example, FIG. 2 depicts seven (7) gas stick assemblies 202*a-g* and three (3) inert gas stick assemblies 203*a-c*. However, this is not meant to limit the amount or type of gas stick assemblies that may be included in the gas panel 200. In some embodiments, the gas panel 200 may include 1, 2, 3, 4, 5, 6, 7, 8, 9, 10, 11, 12, 13, 14, 15, 16, 17, 18, 19, or 20 gas stick assemblies 202*a-g* and 1, 2, 3, 4, 5, 6, 7, 8, 9, 10, 11, 12, 13, 14, 15, 16, 17, 18, 19, or 20 inert gas stick assemblies 203*a-c*. Further, the components of each gas stick assembly 202*a-g* and inert gas stick assembly 203*a-c* of FIG. 2 are not labeled herein for clarity, but it is to be understood that each gas stick assembly 202*a-g* and inert gas stick assembly 203*a-c* may include the same or different components to those described herein for some gas stick assemblies.

The gas stick assembly 202*a-g* in embodiments may include a hybrid valve 204, a purge valve 205, a regulator 206, a filter or purifier 207, an upstream valve 208, an MFC 209 and/or a downstream valve 210. The hybrid valve 204 may allow for the gas to flow through the gas stick assembly if in an open position or may keep gas from flowing into in the gas stick assembly if in a closed position. The hybrid valve 204 may include a combination of a manual valve and a valve that can be automatically actuated (e.g., a pneumatic valve, electrical valve, etc.). The purge valve 205 may be used to purge out toxic gas before working on the toxic gas stick assembly. The regulator 206 may be a pressure regulator which may control the pressure within the gas stick assembly 200. The filter or purifier 207 may reduce any contaminants from entering. The upstream valve 208 may be in an open or closed position to allow gas to either leave or remain in the MFC 209, depending on the process.

MFC 209 may include a pressure sensor, which provides pressure data of the gas stick assembly. The downstream valve 210 may be in an open or closed position to allow gas to either leave or remain in the MFC 209, depending on the process. The inert gas stick assembly 203*a-c* in embodiments may include a manual valve 211, a regulator 206, a filter or purifier 207, an upstream valve 208, a MFC 209 and a downstream valve 210.

In some embodiments, gas stick 203*a* may be coupled to a mass flow verification unit 250. Mass flow verification unit 250 may be coupled to a controller 251. Mass flow verification unit 250 can include a rate-of-rise volume having an inlet that couples the rate-of-rise volume to a gas stick 203*a* of the gas panel 200 and an outlet that couples the rate-of-rise volume to an exhaust line of the mass flow verification unit 250. A variable orifice can be coupled to the inlet of the rate-of-rise volume and an outlet isolation valve can be coupled to the outlet.

Gas can be flowed into the rate-of-rise volume from gas stick 203*a* at a flow rate setpoint determined using an internal flow sensor of MFC 209 of gas stick 203*a*. The rate-of-rise volume can be placed into a choked pressure regime by using controller 251 to actuate the opening of the variable orifice to establish the choked pressure regime within the rate-rise-volume.

Controller 251 closes the outlet isolation valve when the choked pressure regime is achieved to cause the rate-of-rise volume to be filled with the gas from the gas stick 203*a*. Controller 251 determines a pressure rate-of-rise within the rate-of-rise volume under the choked pressure regime using measurements from pressure sensors of mass flow verification unit 250 and a flow duration. Controller 251 can determine a first flow rate based on the pressure rate-of-rise, the volume of the rate-of-rise volume, and temperature measurements (e.g., from a temperature sensor coupled to the rate-or-rise volume). In some embodiments, Controller 251 can determine a second flow rate based the internal flow sensor of the MFC 209 of gas stick 203*a*. Controller 251 can determine a difference between the first flow rate and the second flow rate and determine an offset to apply to the internal flow sensor of MFC 209 based on the difference.

In some embodiments, mass flow verification unit 250 can be a portable unit 270 including a wheeled cart. Controller 251 may also be a part of portable unit 270. Portable unit 270 can be used for chamber matching across multiple chambers of a semiconductor manufacturing system.

Figure 3:
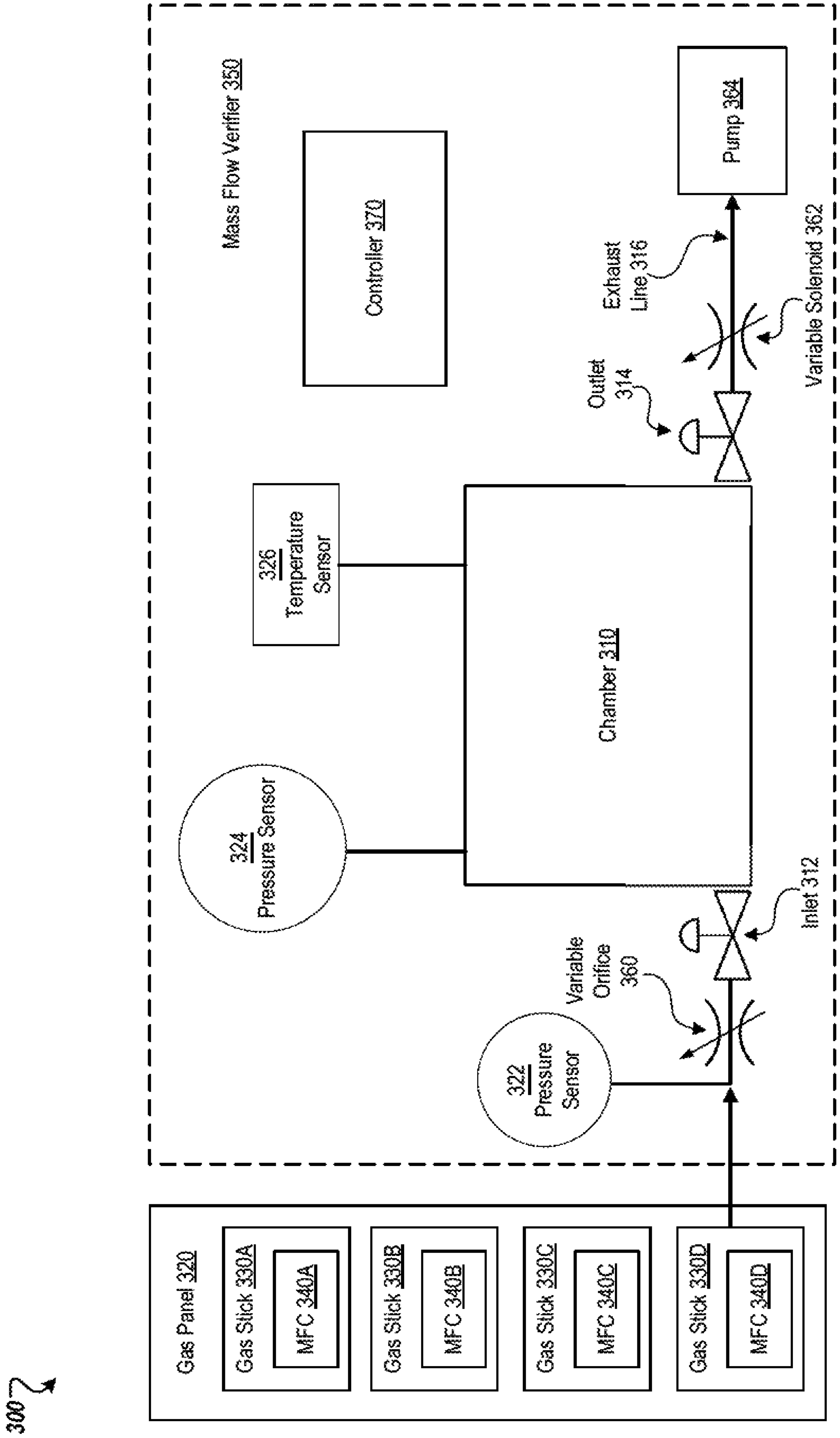
FIG. 3 illustrates a schematic of a mass flow verification system, according to some embodiments.

FIG. 3 illustrates a schematic of a mass flow verification system 300, according to some embodiments.

In some embodiments, mass flow verification system 300 can be connected to a gas panel 320. Gas panel 320 can be a part of a semiconductor manufacturing system and can be used to distribute various process gases to manufacturing equipment of the semiconductor manufacturing system. Gas panel 320 can include valves, regulators, MFCs, etc. Gas panel 320 can the same as or similar to gas panel 120 of FIG. 1 or gas panel 200 of FIG. 2. Gas panel 320 includes gas sticks 330A, 330B, 330C, and 330D. Gas panel 320 includes MFCs 340A, 340B, 340C, and 340D, each corresponding respectively to gas sticks 330A-D.

Mass flow verification system 300 can include a mass flow verifier 350 that is operatively coupled to a gas stick (e.g., gas stick 330D) of gas panel 320. Mass flow verifier 350 includes a chamber 310 that serves as a rate-of-rise volume. In some embodiments, a rate-of-rise volume can be a confined space within a system used to measure the rate at which gas pressure increases over time. By correlating the time-dependent change in pressure within the known rate-of-rise volume, various gas properties or system conditions can be inferred.

Mass flow verifier 350 further includes an inlet 312 (to couple chamber 310 to gas stick 330D and an outlet 314 to couple chamber 310 to an exhaust line 316. In some embodiments, inlet 312 includes an inlet isolation valve and outlet 314 includes an outlet isolation valve. A variable orifice 360 is coupled to inlet 312. An outlet isolation valve is coupled to outlet 314. Inlet 312, chamber 310, and variable orifice 360 make up at least a part of a flow path for a gas from gas stick 330D. Mass flow verifier 350 includes a first pressure sensor 322 coupled to inlet 312 upstream of variable orifice 360. Mass flow verifier 350 further includes a second pressure sensor 324 coupled to chamber 310. Mass flow verifier 350 can also include a temperature sensor 326 coupled to chamber 310. In some embodiments, temperature sensor 326 can be a resistance temperature detector or any other kind of temperature sensor.

Mass flow verifier 350 further includes a controller 370. In some embodiments, controller 370 can cause a gas (e.g., from gas stick 330D) to flow into chamber 310. In some embodiments, controller 370 can cause the gas to flow from gas stick 330D through the flow path at a flow rate setpoint. A flow rate setpoint in can be a pre-determined and programmable rate of fluid flow, which an MFC (e.g., of a gas stick) is configured to regulate and maintain. A flow rate setpoint can be established based on specific process parameters, dictating the precise flow rate at which the MFC is to operate. In some embodiments, variable controlled orifice 360 can be actuated to achieve a pressure setpoint based on desired process conditions (e.g., gas type, flow rate, pressure, temperature, etc.). Variable orifice 360 can be actuated based on feedback received from a pressure sensor (e.g., pressure sensor 322). Through continuous monitoring and adjustment, deviations from the target pressure can be corrected by modifying the flow resistance offered by variable orifice 360, thereby achieving stable and consistent pressure control. In some embodiments, variable orifice 360 can operate in a closed-loop with the pressure sensor 322 at the inlet of the variable orifice 360. Once the target pressure setpoint is achieved the position of the variable orifice 360 can be locked, (e.g., stepper position, piezo displacement position, etc. can be locked).

In some embodiments, a flow rate setpoint can be established to closely replicate the conditions of specific processes that are be carried out within a processing chamber. This allows conditions inside chamber 310 to closely resemble actual conditions under which the processes are to be performed. By mimicking process conditions accurately, including the precise flow rate of gases or liquids, temperature, and pressure, mass flow verification can be carried out effectively and accurately.

A MFC can include an internal flow sensor. The MFC can be set to a flow set point to be measured. The flow set point may be based on a gas type, a target flow rate, and/or one or more target process conditions of a process to be emulated. The MFC can be adjusted to stabilize the actual flow of the gas to align with a setpoint based on readings from the internal flow sensor.

In some embodiments, controller 370 is to cause chamber 310 to be placed into a choked pressure regime while the gas (e.g., from gas stick 330D) is flowed into chamber 310. For example, controller 370 can actuate an opening of variable orifice 360 to establish the choked pressure regime within chamber 310. The choked pressure regime may be achieved by causing a first pressure upstream of variable orifice 360 to be at least two times a second pressure downstream of variable orifice 360.

In some embodiments, controller 370 can cause chamber 310 to be placed in the choked pressure regime based at least in part on measurements from first pressure sensor 322. For example, to establish the choked pressure regime controller 370 is to determine a target pressure upstream of variable orifice 360 based on a process to be simulated (e.g., based on a flow rate setpoint). Controller 370 is further to measure the first pressure upstream of variable orifice 360 using first pressure sensor 322. In some embodiments, first pressure sensor 322 may be a manometer. Controller 370 is further to actuate the opening of variable orifice 360 to cause the first pressure to match the target pressure.

In some embodiments, the target pressure can be determined by using a look-up table. A lookup table can be a data structure, typically stored in a memory, that maps input values to corresponding predetermined output values. In this case, the look-up table functions by allowing rapid retrieval of output data (e.g., target pressure at a point upstream of variable orifice 360) based on specific input criteria (e.g., a setpoint flow rate). Achieving the target pressure at the point upstream of the variable orifice corresponds to achieving the choked flow regime at the corresponding flow setpoint. The look-up table can contain predetermined target pressures that correspond to the choked flow regime based on the process to be simulated (e.g., at a particular flow rate setpoint). Alternatively, the target pressure can be calculated using mathematical relationships between parameters of the process to be simulated.

In some embodiments, to establish the choked pressure regime controller 370 is to determine a target pressure ratio between the first pressure upstream of variable orifice 360 and the second pressure downstream of variable orifice 360. In some embodiments, first pressure sensor can be a differential manometer capable of taking two pressure measurements at two different points (e.g., first upstream of variable orifice 360 and the second pressure downstream of variable orifice 360). Controller 370 may further determine an actual pressure ratio between the first pressure and the second pressure by measuring the first pressure and the second pressure using first pressure sensor 322. Controller 370 may further actuate the opening of variable orifice 360 to cause the actual pressure ratio to match the target pressure ratio, thus achieving the choked flow regime.

After achieving the choked flow regime, controller 370 can further close outlet 314 to cause chamber 310 to be filled with the gas from gas stick 330D.

After achieving the choked flow regime and closing outlet 314, controller 370 is further to determine a pressure rate-of-rise within chamber 310 under the choked pressure regime based at least in part on measurements from second pressure sensor 324 coupled to chamber 310. Second pressure sensor 324 (coupled to a chamber 310) can take at least two pressure measurements in chamber 310. Each pressure measurement is taken at specific time over a time interval (e.g., the beginning and the end). The pressure rate-of-rise can be calculated by determining the change in pressure between the at least two pressure measurements over the time interval. Additionally, temperature variations can impact the rate-of-rise measurement and calculation. Temperature sensor 326 can provide real-time temperature data of the gas within chamber 310. This temperature data, along with the pressure measurements, can be used to correct for temperature-induced variations in gas density or volume, ensuring the calculated pressure rate-of-rise accurately reflects the true gas flow characteristics under varying thermal conditions.

Controller 370 is further to determine one or more flow measurements based at least in part on the pressure rate-of-rise. For example, controller 370 can determine a first flow rate of the gas based at least in part on the pressure rate-of-rise. Controller 370 can further determine a second flow rate of the gas as measured by the internal flow sensor of the MFC of gas stick 330D. Controller 370 can further determine a difference between the first flow rate and the second flow rate. Controller 370 can determine an offset to apply to readings from the internal flow sensor of the MFC based on the difference. By applying the offset to the readings from the internal flow sensor of the MFC, any drift or miscalibration can be corrected causing the MFC to accurately achieve flow rate setpoints.

In some embodiments, mass flow verifier 350 further includes a variable solenoid 362 coupled to outlet 314 downstream of outlet 314. A pump 364 can be coupled to variable solenoid 362 downstream of variable solenoid 362. Pump 364 is to remove the gas from chamber 310 (e.g., following correction of drift to the internal flow sensor of the MFC 340D).

In some embodiments, an opening of variable solenoid 362 is to be actuated to control a pressure pump down of chamber 310 according to a predetermined pressure profile after a pressure rate of rise measurement is made. In some embodiments, the gas inside chamber 310 can be removed from chamber 310 following a predetermined pressure profile in order to avoid aerosolized gas condensing on an inside surface of the chamber 310. In a rate of rise volume (e.g., chamber 310) condensation of gas can alter the effective fillable volume of the chamber and negatively impact the operational health of the system. This leftover condensation can also obstruct the exhaust pathways of the chamber 310, leading to inefficient gas removal and potentially causing long-term damage or contamination to the interior surfaces and sensors of the chamber 310. Condensed gas can occupy less volume as a liquid, leading to inaccuracies in volume-based measurements and potentially causing malfunction or degradation of the components of the chamber. Therefore, maintaining conditions that avoid gas condensation, especially during the exhausting process, is beneficial for preserving the accuracy of rate of rise measurements.

In some embodiments, the predetermined pressure profile for exhausting the chamber 310 can be determined based on a gas type, temperature, pressure, etc. The predetermined pressure profile can be implemented to prevent aerosolizing of the gas within chamber 310 upon evacuation of the gas from chamber 310.

FIGS. 4A-D are flow diagrams of a methods associated with variably choked pressure rate-of-rise mass flow verification, according to some embodiments. Methods 400A-D may be performed by processing logic that may include hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiment, methods 400A-D may be performed, in part, by portable unit 170, portable unit 270, and/or mass flow verification system 300. In some embodiments, a non-transitory storage medium stores instructions that when executed by a processing device (e.g., of processing system, of) cause the processing device to perform one or more of methods 400A-B.

For simplicity of explanation, methods 400A-D are depicted and described as a series of operations. However, operations in accordance with this disclosure can occur in various orders and/or concurrently and with other operations not presented and described herein. Furthermore, not all illustrated operations may be performed to implement methods 400A-D in accordance with the disclosed subject matter. In addition, those skilled in the art will understand and appreciate that methods 400A-D could alternatively be represented as a series of interrelated states via a state diagram or events.

Figure 4A:
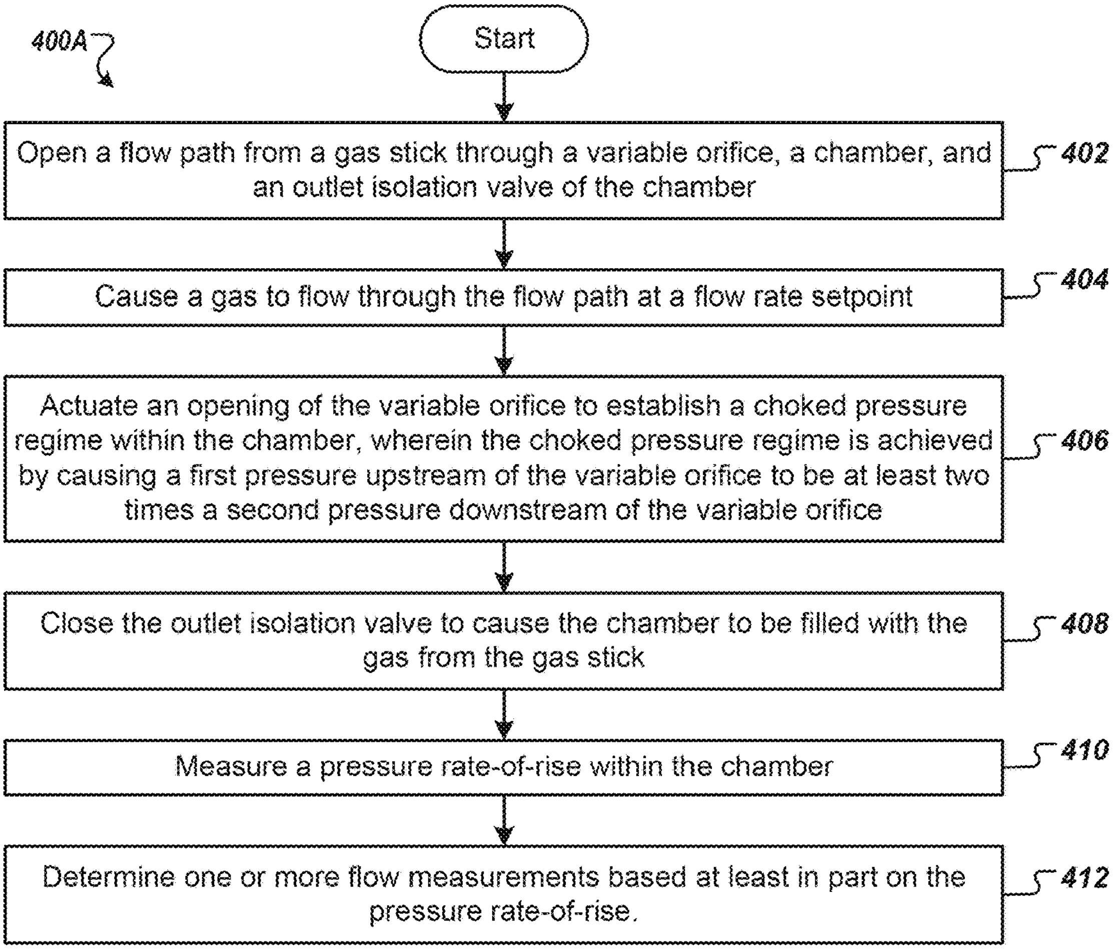
FIGS. 4A-D are flow diagrams of methods associated with variably choked pressure rate-of-rise mass flow verification, according to some embodiments.

FIG. 4A is a flow diagram of a method 400A for variably choked pressure rate-of-rise mass flow verification, according to certain embodiments.

Referring to FIG. 4A, in some embodiments, at block 402 the processing logic implementing method 400A opens a flow path from a gas stick through a variable orifice, a chamber, and an outlet isolation valve of the chamber.

At block 404, the processing logic causes a gas to flow through the flow path at a flow rate setpoint. In some embodiments, causing the gas to flow through the flow path at the flow rate setpoint further includes setting a flow rate setpoint of a mass flow controller of the gas stick to a predetermined flow rate.

At block 406, the processing logic actuates an opening of the variable orifice to establish a choked pressure regime within the chamber, where the choked pressure regime is achieved by causing a first pressure upstream of the variable orifice to be at least two times a second pressure downstream of the variable orifice.

At block 408, the processing logic closes the outlet isolation valve to cause the chamber to be filled with the gas from the gas stick.

At block 410, the processing logic subsequently determines a pressure rate-of-rise by measuring the pressure rate-of-rise within the chamber.

At block 412, the processing logic determines one or more flow measurements based at least in part on the pressure rate-of-rise.

In some embodiments, the processing logic can actuate an opening of a variable solenoid proximate the outlet isolation valve to control a pressure pump down of the chamber according to a predetermined pressure profile after determining the one or more flow measurements.

Figure 4B:
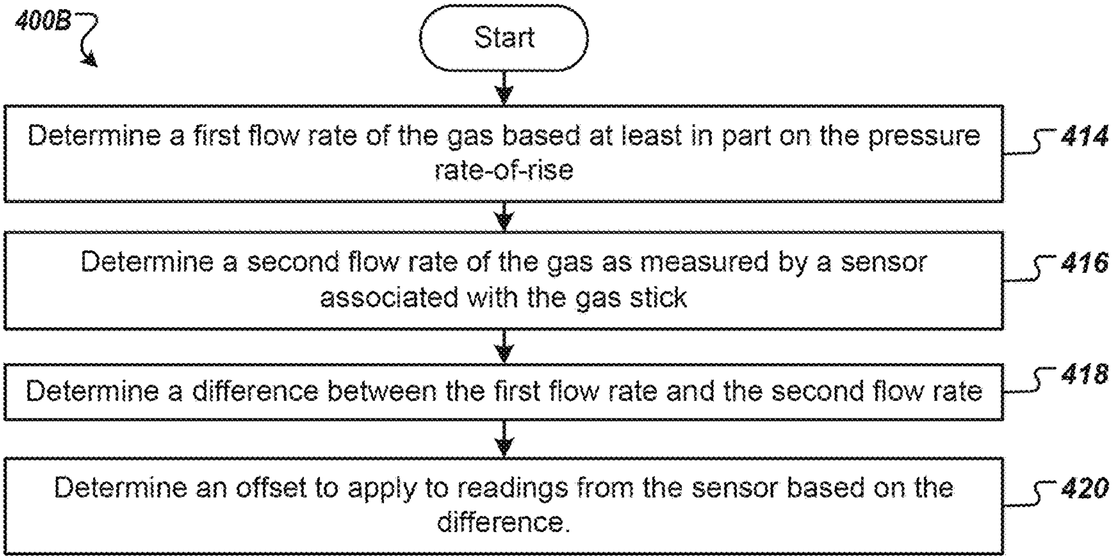

FIG. 4B is a method 400B for variably choked pressure rate-of-rise mass flow verification, according to some embodiments. In some embodiments, the operations of method 400B can be performed as a part of block 412 of method 400A of FIG. 4A.

Referring to FIG. 4B, at block 414 of method 400B, the processing logic determines a first flow rate of the gas based at least in part on the pressure rate-of-rise.

At block 416, the processing logic determines a second flow rate of the gas as measured by a sensor associated with the gas stick.

At block 418, the processing logic determines a difference between the first flow rate and the second flow rate.

At block 420, the processing logic determines an offset to apply to readings from the sensor based on the difference. The offset may be saved for a tested gas stick, and may be applied to settings of an MFC of the gas stick to account for identified inaccuracies of the MFC determined based on performing methods 400A and/or 400B.

Figure 4C:
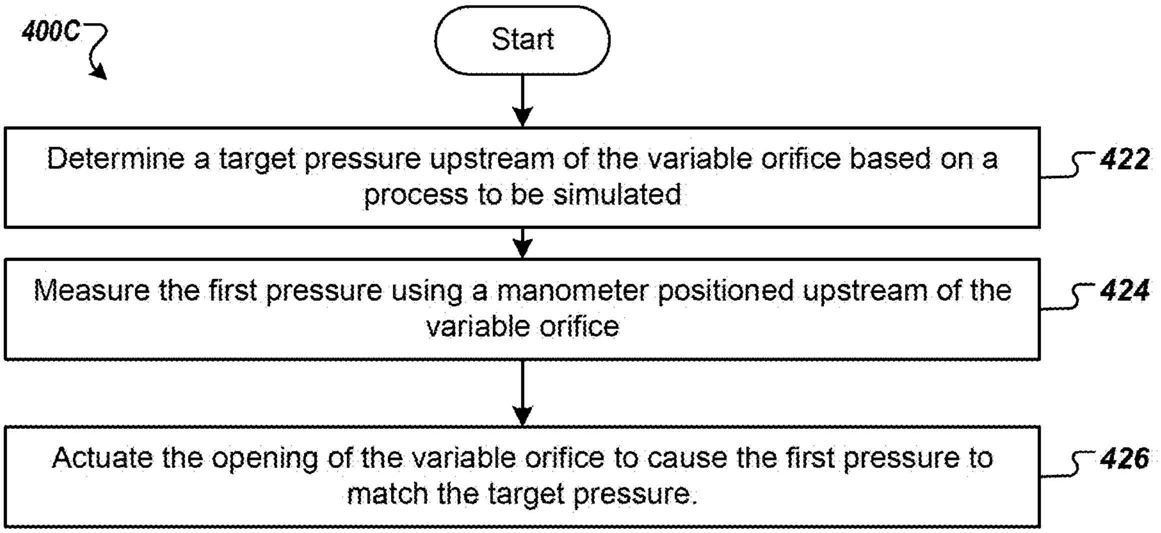

FIG. 4C is a method 400C for variably choked pressure rate-of-rise mass flow verification, according to some embodiments. In some embodiments, the operations of method 400C can be performed as a part of block 406 of method 400A described in FIG. 4A.

Referring to FIG. 4C, at block 422 of method 400C, the processing logic determines a target pressure upstream of the variable orifice based on a process to be simulated. In some embodiments, determining the target pressure upstream of the variable orifice includes using a look-up table to determine the target pressure. The look-up table can contain predetermined target pressures based on the process to be simulated. The look-up table functions by allowing rapid retrieval of output data (e.g., target pressure at a point upstream of variable orifice 360) based on specific input criteria (e.g., a setpoint flow rate). Achieving the target pressure at the point upstream of the variable orifice corresponds to achieving the choked flow regime at the corresponding flow setpoint. In some embodiments, determining the target pressure upstream of the variable orifice includes calculating the target pressure using mathematical relationships between parameters of the process to be simulated.

At block 424, the processing logic measures the first pressure using a manometer positioned upstream of the variable orifice.

At block 426, the processing logic actuates the opening of the variable orifice to cause the first pressure to match the target pressure.

Figure 4D:
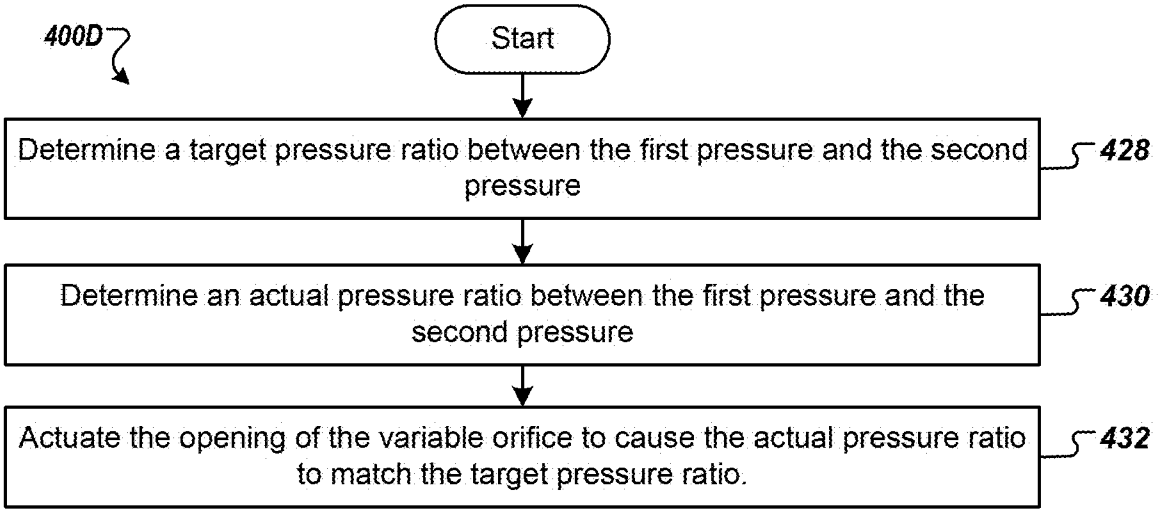

FIG. 4D is a method 400D for variably choked pressure rate-of-rise mass flow verification, according to some embodiments. In some embodiments, the operations of method 400C can be performed as a part of block 406 of method 400A described in FIG. 4A.

Referring to FIG. 4D, at block 428 of method 400D, the processing logic determines a target pressure ratio between the first pressure and the second pressure.

At block 430, the processing logic determines an actual pressure ratio between the first pressure and the second pressure.

At block 432, the processing logic actuates the opening of the variable orifice to cause the actual pressure ratio to match the target pressure ratio.

Figure 5:
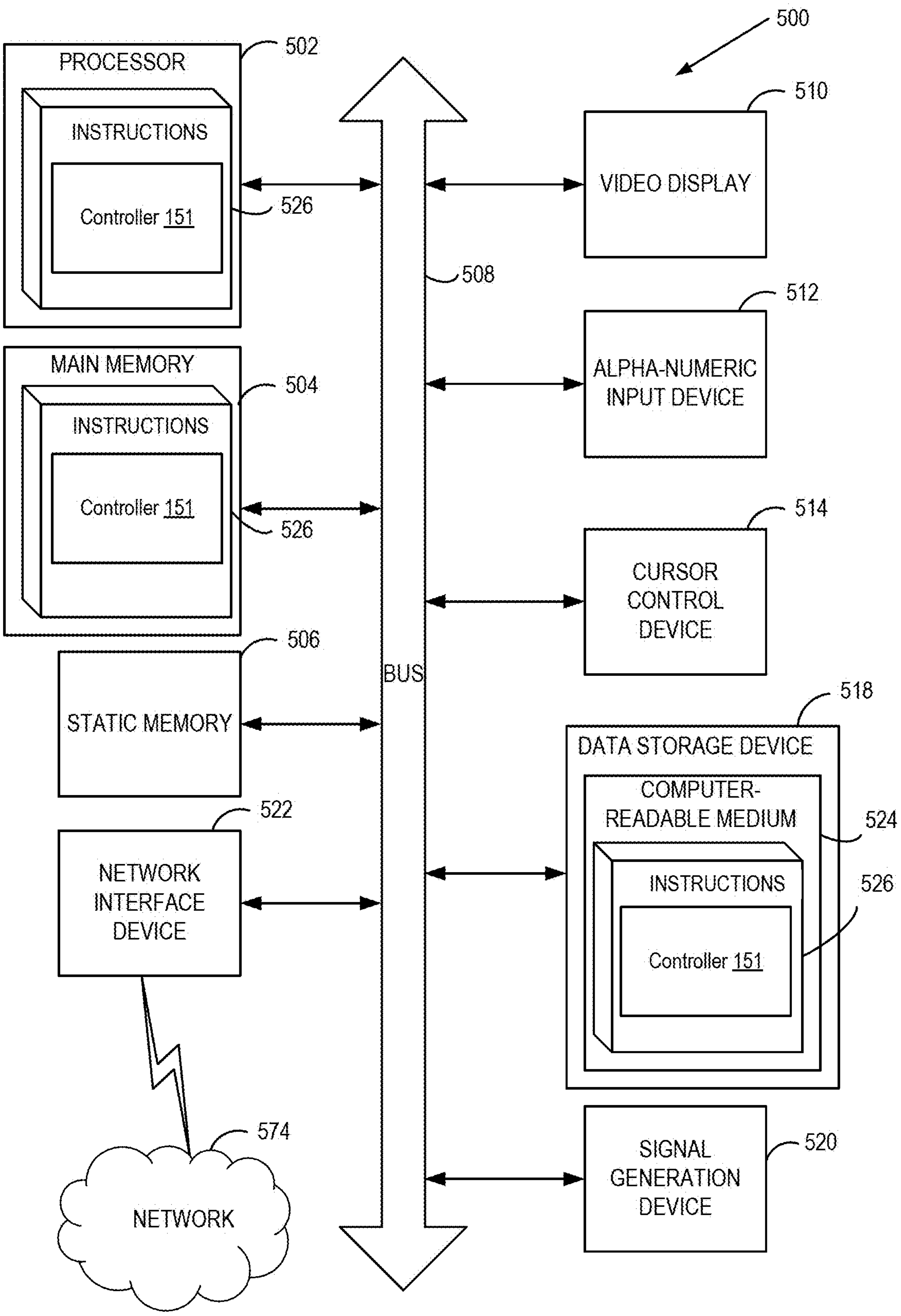
FIG. 5 is a block diagram illustrating a computer system, according to some embodiments.

FIG. 5 is a block diagram illustrating a computer system 500, according to certain embodiments. In some embodiments, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a Set-Top Box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., Random Access Memory (RAM)), a non-volatile memory 506 (e.g., Read-Only Memory (ROM) or Electrically-Erasable Programmable ROM (EEPROM)), and a data storage device 518, which may communicate with each other via a bus 508.

Processing device 502 may be provided by one or more processors such as a general purpose processor (such as, for example, a Complex Instruction Set Computing (CISC) microprocessor, a Reduced Instruction Set Computing (RISC) microprocessor, a Very Long Instruction Word (VLIW) microprocessor, a microprocessor implementing other types of instruction sets, or a microprocessor implementing a combination of types of instruction sets) or a specialized processor (such as, for example, an Application Specific Integrated Circuit (ASIC), a Field Programmable Gate Array (FPGA), a Digital Signal Processor (DSP), or a network processor).

Computer system 500 may further include a network interface device 522 (e.g., coupled to network 574). Computer system 500 also may include a video display unit 510 (e.g., an LCD), an alphanumeric input device 512 (e.g., a keyboard), a cursor control device 514 (e.g., a mouse), and a signal generation device 520.

In some implementations, data storage device 518 may include a non-transitory computer-readable storage medium

524 (e.g., non-transitory machine-readable storage medium) on which may store instructions 526 encoding any one or more of the methods or functions described herein, including instructions encoding components of FIG. 1, FIG. 2, and FIG. 3 (e.g., controller 151, controller 251, and controller 370, etc.) and for implementing methods described herein.

Instructions 526 may also reside, completely or partially, within volatile memory 504 and/or within processing device 502 during execution thereof by computer system 500, hence, volatile memory 504 and processing device 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "causing," "opening," "actuating," "closing," "measuring," "calculating," "changing," "receiving," "performing," "providing," "obtaining," "accessing," "adding," "using," "training," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may include a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods described herein and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

The invention claimed is:

1. A method comprising:

opening a flow path from a gas stick through a variable orifice, a chamber, and an outlet isolation valve of the chamber;

causing a gas to flow through the flow path at a flow rate setpoint;

actuating an opening of the variable orifice to establish a choked pressure regime within the chamber, wherein the choked pressure regime is achieved by causing a first pressure upstream of the variable orifice to be at least two times a second pressure downstream of the variable orifice;

closing the outlet isolation valve to cause the chamber to be filled with the gas from the gas stick;

measuring a pressure rate-of-rise within the chamber; and determining one or more flow measurements based at least in part on the pressure rate-of-rise.

2. The method of claim 1, further comprising:

determining a first flow rate of the gas based at least in part on the pressure rate-of-rise;

determining a second flow rate of the gas as measured by a sensor associated with the gas stick;

determining a difference between the first flow rate and the second flow rate; and determining an offset to apply to readings from the sensor based on the difference.

3. The method of claim 1, wherein the actuating the opening of the variable orifice to establish the choked pressure regime within the chamber comprises:

determining a target pressure upstream of the variable orifice based on a process to be simulated;

measuring the first pressure using a manometer positioned upstream of the variable orifice; and actuating the opening of the variable orifice to cause the first pressure to match the target pressure.

4. The method of claim 3, wherein determining the target pressure upstream of the variable orifice comprises at least one of:

using a look-up table to determine the target pressure, wherein the look-up table contains predetermined target pressures based on the process to be simulated; or calculating the target pressure using mathematical relationships between parameters of the process to be simulated.

5. The method of claim 1, wherein the actuating the opening of the variable orifice to establish the choked pressure regime within the chamber comprises:

determining a target pressure ratio between the first pressure and the second pressure;

determining an actual pressure ratio between the first pressure and the second pressure; and actuating the opening of the variable orifice to cause the actual pressure ratio to match the target pressure ratio.

6. The method of claim 1, wherein causing the gas to flow through the flow path at the flow rate setpoint further comprises setting a flow rate setpoint of a mass flow controller of the gas stick to a predetermined flow rate.

7. The method of claim 1, further comprising actuating an opening of a variable solenoid proximate the outlet isolation valve to control a pressure pump down of the chamber according to a predetermined pressure profile.

8. A system comprising:
- a mass flow verification unit, wherein the mass flow verification unit comprises:
  - a chamber;
  - an inlet to couple the chamber to a gas source and an outlet to couple the chamber to an exhaust line;
  - a variable orifice coupled to the inlet;
  - an outlet isolation valve coupled to the outlet, wherein the inlet, the chamber and the variable orifice make up a flow path for a gas from the gas source;
  - a first pressure sensor coupled to the inlet upstream of the variable orifice;
  - a second pressure sensor coupled to the chamber; and
- a controller to:
  - cause the chamber to be placed into a choked pressure regime while the gas is flowed into the chamber based at least in part on measurements from the first pressure sensor;
  - determine a pressure rate-of-rise within the chamber under the choked pressure regime based at least in part on measurements from the second pressure sensor; and
  - determine one or more flow measurements based at least in part on the pressure rate-of-rise.

9. The system of claim 8, wherein the mass flow verification unit is coupled to a gas stick of a gas panel that is positioned upstream of the mass flow verification unit, and is configured to test the gas stick.

10. The system of claim 8, wherein the controller is further to:
- cause the gas to flow from the gas source through the flow path at a flow rate setpoint, wherein the gas source is a gas stick of a gas panel;
- actuate an opening of the variable orifice to establish the choked pressure regime within the chamber, wherein the choked pressure regime is achieved by causing a first pressure upstream of the variable orifice to be at least two times a second pressure downstream of the variable orifice;
- close the outlet isolation valve to cause the chamber to be filled with the gas from the gas stick; and
- subsequently determine the pressure rate-of-rise.

11. The system of claim 10, wherein causing the gas to flow through the flow path at the flow rate setpoint further comprises setting a flow rate setpoint of a mass flow controller of the gas stick to a predetermined flow rate.

12. The system of claim 8, wherein the controller is further to:
- determine a first flow rate of the gas based at least in part on the pressure rate-of-rise;
- determine a second flow rate of the gas as measured by a sensor associated with the gas source, wherein the gas source is a gas stick of a gas panel;
- determine a difference between the first flow rate and the second flow rate; and
- determine an offset to apply to readings from the sensor based on the difference.

13. The system of claim 8, wherein to establish the choked pressure regime the controller is to:
- determine a target pressure upstream of the variable orifice based on a process to be simulated;
- measure an actual pressure upstream of the variable orifice using the first pressure sensor, wherein the first pressure sensor comprises a manometer; and
- actuate an opening of the variable orifice to cause the actual pressure to match the target pressure.

14. The system of claim 8, wherein to establish the choked pressure regime the controller is to:
- determine a target pressure ratio between a first pressure upstream of the variable orifice and a second pressure downstream of the variable orifice;
- determine an actual pressure ratio between the first pressure and the second pressure by measuring the first pressure and the second pressure using the first pressure sensor, wherein the first pressure sensor comprises a differential manometer; and
- actuate an opening of the variable orifice to cause the actual pressure ratio to match the target pressure ratio.

15. The system of claim 8, wherein the mass flow verification unit further comprises:
- a variable solenoid coupled to the outlet isolation valve of the chamber downstream of the outlet isolation valve; and
- a pump coupled to the variable solenoid downstream of the variable solenoid, wherein the pump is to remove the gas from the chamber, and wherein an opening of the variable solenoid is to be actuated to control a pressure pump down of the chamber according to a predetermined pressure profile.

16. The system of claim 8, wherein the mass flow verification unit is a portable unit comprising a wheeled cart.

17. A mass flow verification system comprising:
- a gas panel, having at least one gas stick, wherein the at least one gas stick comprises a mass flow controller;
- a mass flow verifier operatively coupled to the at least one gas stick, wherein the mass flow verifier comprises:
  - a chamber;
  - an inlet to couple the chamber to the gas stick and an outlet to couple the chamber to an exhaust line;
  - a variable orifice coupled to the inlet;
  - an outlet isolation valve coupled to the outlet, wherein the inlet, the chamber and the variable orifice make up a flow path for a gas from the gas stick;
  - a first pressure sensor coupled to the inlet upstream of the variable orifice;
  - a second pressure sensor coupled to the chamber; and
- a controller to:
  - cause the chamber to be placed into a choked pressure regime while the gas is flowed into the chamber based at least in part on measurements from the first pressure sensor;
  - determine a pressure rate-of-rise within the chamber under the choked pressure regime based at least in part on measurements from the second pressure sensor; and
  - determine one or more flow measurements based at least in part on the pressure rate-of-rise.

18. The mass flow verification system of claim 17, wherein the controller is further to:
- cause the gas to flow from the gas stick through the flow path at a flow rate setpoint;
- actuate an opening of the variable orifice to establish the choked pressure regime within the chamber, wherein the choked pressure regime is achieved by causing a first pressure upstream of the variable orifice to be at least two times a second pressure downstream of the variable orifice;

close the outlet isolation valve to cause the chamber to be filled with the gas from the gas stick; and subsequently determine the pressure rate-of-rise.

19. The mass flow verification system of claim 18, wherein the controller is further to:

determine a first flow rate of the gas based at least in part on the pressure rate-of-rise;

determine a second flow rate of the gas as measured by a sensor associated with the gas stick;

determine a difference between the first flow rate and the second flow rate; and determine an offset to apply to readings from the sensor based on the difference.

20. The mass flow verification system of claim 18, wherein to establish the choked pressure regime the controller is to:

determine a target pressure upstream of the variable orifice based on a process to be simulated;

measure the first pressure using the first pressure sensor, wherein the first pressure sensor comprises a manometer; and actuate the opening of the variable orifice to cause the first pressure to match the target pressure.

* * * * *